US010589488B2

(12) United States Patent
Hojnacki et al.

(10) Patent No.: US 10,589,488 B2
(45) Date of Patent: Mar. 17, 2020

(54) FOAM ARTICLE

(71) Applicant: PROPRIETECT L.P., Toronto (CA)

(72) Inventors: Henry Hojnacki, Sterling Heights, MI (US); Mark Weierstall, Roseville, MI (US)

(73) Assignee: PROPRIETECT L.P., Toronot (CA)

( * ) Notice: Subject to any disclaimer, the term of this patent is extended or adjusted under 35 U.S.C. 154(b) by 107 days.

(21) Appl. No.: 15/309,041

(22) PCT Filed: May 6, 2015

(86) PCT No.: PCT/CA2015/000294
§ 371 (c)(1),
(2) Date: Nov. 4, 2016

(87) PCT Pub. No.: WO2015/168772
PCT Pub. Date: Nov. 12, 2015

(65) Prior Publication Data
US 2017/0072658 A1 Mar. 16, 2017

Related U.S. Application Data

(60) Provisional application No. 61/989,076, filed on May 6, 2014.

(51) Int. Cl.
*B32B 5/02* (2006.01)
*B32B 3/26* (2006.01)
(Continued)

(52) U.S. Cl.
CPC .............. *B32B 3/263* (2013.01); *B32B 3/30* (2013.01); *B32B 5/022* (2013.01); *B32B 5/024* (2013.01);
(Continued)

(58) Field of Classification Search
CPC ...... B60N 2/58–70; A47C 27/142–146; B32B 25/10; B32B 27/02; B32B 5/02–12; B32B 5/26

See application file for complete search history.

(56) References Cited

U.S. PATENT DOCUMENTS 4,989,284 A 2/1991 Gamm
6,263,530 B1* 7/2001 Feher ...................... A47C 7/74
165/185

(Continued)

FOREIGN PATENT DOCUMENTS

CA 2841871 A 1/2013
JP 2008-533414 A 8/2008

(Continued)

OTHER PUBLICATIONS

International Search Report and Written Opinion corresponding to International Patent Application No. PCT/CA2015/000294, dated Sep. 1, 2015 (9 pages).

(Continued)

*Primary Examiner* — Z. Jim Yang
(74) *Attorney, Agent, or Firm* — McAndrews, Held & Malloy, Ltd.; Michael S. Tomsa

(57) ABSTRACT

There is described a foam article comprising: a base foam having a textured surface; a trim cover covering at least a portion of the textured surface, the trim cover comprising: (i) a finished outer layer comprising an occupant-contact outer portion and inner portion; (ii) a compressible buffer layer secured with respect to the inner portion of the finished outer layer; and (iii) a contact layer secured with respect to the compressible layer and configured to be in contact with the textured surface of the base foam, the contact layer having a secant modulus at 5% strain of at least about 7 when measured according to modified ASTM D3574-11, Test E, Tensile Test. There is also described a foam article compris- (Continued)

ing: a base foam having a textured surface; a trim cover comprising a finished outer layer; and optionally, a contact layer interposed between the foam element and the trim cover, the contact layer in contact with at least a portion of the textured surface of the base foam and comprising a contact material; the foam article having a read through score of at least 20 when measured pursuant to modified ASTM D3575-11 I2 (Procedure B). The present inventors have discovered that the occurrence of "read through" may be obviated or mitigated if the contact layer having a secant modulus at 5% strain of at least about 7 when measured according to modified ASTM D3574-11, Test E, Tensile Test is used.

133 Claims, 3 Drawing Sheets

(51) Int. Cl.
| | | |
|---|---|---|
| B32B 5/24 | (2006.01) | |
| B32B 3/30 | (2006.01) | |
| B32B 27/34 | (2006.01) | |
| B32B 27/06 | (2006.01) | |
| B32B 27/32 | (2006.01) | |
| B32B 27/36 | (2006.01) | |
| B60N 2/58 | (2006.01) | |
| B32B 5/18 | (2006.01) | |
| B60N 2/64 | (2006.01) | |

(52) U.S. Cl.
CPC .............. *B32B 5/028* (2013.01); *B32B 5/18* (2013.01); *B32B 5/245* (2013.01); *B32B 27/065* (2013.01); *B32B 27/32* (2013.01); *B32B 27/34* (2013.01); *B32B 27/36* (2013.01); *B60N 2/5891* (2013.01); *B60N 2/64* (2013.01); *B32B 2262/0253* (2013.01); *B32B 2262/0261* (2013.01); *B32B 2262/0276* (2013.01); *B32B 2262/14* (2013.01); *B32B 2266/0278* (2013.01); *B32B 2307/50* (2013.01); *B32B 2307/54* (2013.01); *B32B 2307/56* (2013.01); *B32B 2307/72* (2013.01); *B32B 2307/722* (2013.01); *B32B 2605/003* (2013.01); *B32B 2605/08* (2013.01)

(56) References Cited

U.S. PATENT DOCUMENTS

| | | | |
|---|---|---|---|
| 6,372,076 B1* | 4/2002 | Ogle | A47C 27/22 156/254 |
| 8,087,726 B2* | 1/2012 | Chen | A47C 7/402 297/230.1 |
| 2003/0041379 A1 | 3/2003 | Habboub et al. | |
| 2006/0137358 A1* | 6/2006 | Feher | B60N 2/5635 62/3.3 |
| 2006/0273650 A1* | 12/2006 | Embach | A47C 7/18 297/452.27 |
| 2009/0033130 A1* | 2/2009 | Marquette | A47C 7/74 297/180.15 |
| 2010/0175196 A1* | 7/2010 | Lafleche | A61G 7/05715 5/707 |
| 2010/0181796 A1 | 7/2010 | Galbreath et al. | |
| 2010/0314929 A1 | 12/2010 | Hsu | |
| 2011/0076439 A1* | 3/2011 | Zeilon | B32B 5/022 428/71 |
| 2011/0091689 A1* | 4/2011 | Horio | C08G 18/165 428/160 |
| 2011/0256369 A1* | 10/2011 | Switzer | A47C 27/001 428/215 |
| 2012/0235321 A1 | 9/2012 | San Miguel et al. | |
| 2012/0299358 A1 | 11/2012 | Herbst | |
| 2014/0208521 A1* | 7/2014 | Farnham | A47C 27/144 5/724 |
| 2017/0198111 A1* | 7/2017 | Chen | B32B 5/022 |

FOREIGN PATENT DOCUMENTS

| | | |
|---|---|---|
| JP | 2008-537500 A | 9/2008 |
| JP | 2014-527842 A | 10/2014 |
| JP | WO 2009/157450 A1 | 12/2017 |

OTHER PUBLICATIONS

Extended European search report for application No. 1578929.4, dated Dec. 15, 2017.
Chinese office action for application No. 201580023916.1, dated Apr. 4, 2018.
Chinese office action for application No. 201580023916.1, dated Feb. 19, 2019.
Japanese office action for application No. 2016-567032, dated Apr. 2, 2019.

* cited by examiner ically produced separately and secured together increasing
FOAM ARTICLE

CROSS-REFERENCE TO RELATED APPLICATION

The present application is a National Phase Entry of PCT International Application No. PCT/CA2015/000294, which was filed on May 6, 2015, and claims the benefit under 35 U.S.C. § 119(e) of provisional patent application Ser. No. 61/989,076, filed May 6, 2014, the contents of which are hereby incorporated by reference.

BACKGROUND OF THE INVENTION

Field of the Invention

In one of its aspects, the present invention relates to a foam article. In another of its aspects, the present invention relates to vehicular seat element.

Description of the Prior Art

Passenger seats in vehicles, such as automobiles, are typically fabricated from a foam (usually a polyurethane foam) material which is molded into the desired shape and covered with an appropriate trim cover. The foamed material is selected to provide passenger comfort by providing a resilient seat and the trim cover is selected to provide the desired aesthetic properties.

In recent years, seats such as vehicular seats have been developed to confer one or more of the following to the seat: comfort, climate control, occupant detection and the like.

One area that has received particular attention is the provision of dual density or dual firmness seat components that are more dense or firmer in the peripheral portions of the seat thereby conferring to the occupant a snug or "wrapped-in" feel. This is especially important in performance vehicles which are designed such that turning at relatively high speed may be accomplished. However, there is an ongoing challenge to balance support provided by the seat with comfort of the occupant.

Dual density or dual firmness seat elements are expensive to produce and, in many cases, alter the feel of the supporting surface of the seat only in areas where it is perceived to be important to have different firmness properties. In other words, the conventional dual density or dual firmness seat elements use a generally coarse approach to provision of variable density or firmness.

Further, dual (or multi) density or dual (or multi) firmness seats typically require the use of two or more types of foam (e.g., molded, free rise, bead and the like) which are typically produced separately and secured together increasing the production time and costs of the final seat product. Alternatively, certain dual (or multi) firmness seats are made by molding or otherwise securing an insert (e.g., wire components, flexolators and the like) to a foam substrate.

International Publication No. WO 2006/102751 [San Miguel et al. (San Miguel)] teaches a foam seat element, a mold for production thereof and a method to manufacture the mold. The foam seat element taught by San Miguel comprises a seating surface in which one or more textured surfaces, the same or different, are created. The provision of such textured surfaces makes it possible to achieve in a single density part the "dual firmness" (or multi-firmness) comfort or feel that is conveniently achieved using multi-density foam pieces in a seat element. One of the advantages of the approach in San Miguel is it is possible to confer to the seat element a soft feel touch as an alternative to conventional so-called plus padding.

While the teachings in San Miguel represent an advance in the art, there is still room for improvement.

Specifically, when applying the teachings of San Miguel to vehicular car seats, it is conventional to create the one or more textured surfaces in the so-called A-surface of the vehicular seat. In doing this, there is a likelihood that the textured surface can be felt or seen through the trim cover used to cover the foam seat element—this is also known in the art as "read through". This is particularly a problem when the trim cover is air permeable—e.g., a cloth trim cover. Automotive companies have continually increased the specifications and requirements for fit and finish of vehicular seats and the occurrence of "read through" in a vehicular seat is considered a disadvantage that is unacceptable. Accordingly, there have been challenges in extending the teachings in San Miguel to commercial vehicular seats.

Accordingly, it would be desirable to have a foam article which, on the one hand, maintains the technical advantage of San Miguel (i.e., the ability to have different zones of comfort or feel in a surface of a foam element while a using a single density foam) while, on the other hand, obviating or mitigating the occurrence of "read through" in the A-surface of the foam element when it is adapted for vehicular seats, particularly when such seats utilize an air permeable trim cover such as a cloth trim cover.

It would be particularly advantageous if such an improvement could be implemented without the requirement for large capital expenditure.

SUMMARY OF THE INVENTION

It is an object of the present invention to obviate or mitigate at least one of the above-mentioned disadvantages of the prior art.

It is further object of the present invention to provide a novel foam article.

Accordingly, in one of its aspects, the present invention provides a foam article comprising:

a base foam having a textured surface;

a trim cover covering at least a portion of the textured surface, the trim cover comprising: (i) a finished outer layer comprising an occupant-contact outer portion and inner portion; (ii) a compressible buffer layer secured with respect to the inner portion of the finished outer layer; and (iii) a contact layer secured with respect to the compressible layer and configured to be in contact with the textured surface of the base foam, the contact layer having a secant modulus at 5% strain of at least about 7 when measured according to modified ASTM D3574-11, Test E, Tensile Test.

In another of its aspects, the present invention provides a foam article comprising:

a base foam having a textured surface;

a trim cover comprising a finished outer layer; and optionally, a contact layer interposed between the foam element and the trim cover, the contact layer in contact with at least a portion of the textured surface of the base foam and comprising a contact material;

the foam article having a read through score of at least 20 when measured pursuant to modified ASTM D3575-11 $I_2$ (Procedure B).

Thus, in relation to a first aspect of the invention, the present inventors have discovered an approach by which it is possible to achieve the benefits described in San Miguel while obviating or mitigating the occurrence of "read through". Specifically, the present inventors have discovered that the tensile properties of the contact layer used in the present foam article are important to obviating or mitigating "read through". More particularly, the present inventors have discovered that the occurrence of "read through" may be obviated or mitigated if the contact layer having a secant modulus at 5% strain of at least about 7 when measured according to modified ASTM D3574-11, Test E, Tensile Test (defined in more detailed hereinbelow) is used. Conversely, the contact layer has a secant modulus at 5% strain of less than about 7 when measured according to modified ASTM D3574-11, Test E, Tensile Test, "read through" will typically occur. While not wishing to be bound by any particular theory or mode of action, it is believed that the occurrence of "read through" may be obviated or mitigated if the contact layer has sufficient tensile properties to create a so-called "hammock effect" when the contact layer is interposed between the finished outer layer of the trim cover and the textured surface of the foam block. A "hammock effect" is created when the trim cover is maintained in a relatively taut configuration when the foam article is subjected to compression. It is believed that a greater "hammock effect" is created when the contact layer has a secant modulus at 5% strain of at least about 7 when measured according to modified ASTM D3574-11, Test E, Tensile Test—this is believed to create larger spacing between the trim cover and textured surface of the foam block thereby obviating or mitigating the occurrence of "read through". It is further believed that a lower "hammock effect" is created when the contact layer has a secant modulus at 5% strain of less about 7 when measured according to modified ASTM D3574-11, Test E, Tensile Test—this is believed to create smaller spacing between the trim cover and textured surface of the foam block thereby encouraging the occurrence of "read through". In this manner, the occurrence of "read through" described above is obviated or mitigated in the present foam article.

In relation to a second aspect of the invention, the present inventors have discovered that it is possible to select a combination of a base foam having a textured surface; a trim cover comprising a finished outer layer; and optionally, a contact layer interposed between the foam element and the trim cover, the contact layer in contact with at least a portion of the textured surface of the base foam and comprising a contact material to provide the foam article having a read through score of at least 20 when measured pursuant to modified ASTM D3575-11 $I_2$ (Procedure B).

Of course, those of skill in the art will recognize other advantages accruing from the present seat element based on the present specification.

BRIEF DESCRIPTION OF THE DRAWING

Embodiments of the present invention will be described with reference to the accompanying drawings, in which.

DETAILED DESCRIPTION OF THE PREFERRED EMBODIMENTS

Figure 1:
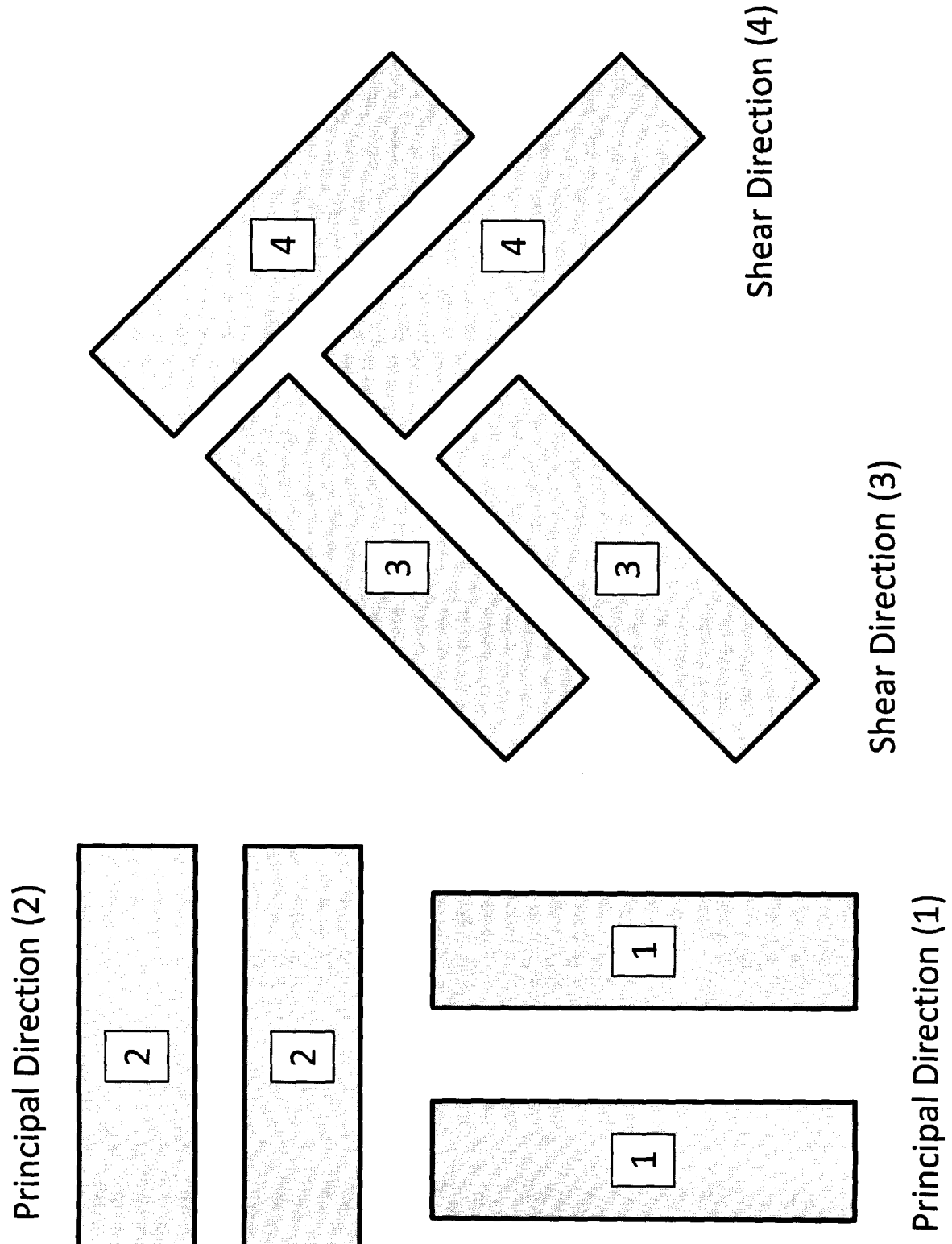
FIGS. 1-3 illustrate various details from the examples described hereinbelow.

Thus, in a first embodiment, the present invention relates to a foam article comprising: a base foam having a textured surface; a trim cover covering at least a portion of the textured surface, the trim cover comprising: (i) a finished outer layer comprising an occupant-contact outer portion and inner portion; (ii) a compressible buffer layer secured with respect to the inner portion of the finished outer layer; and (iii) a contact layer secured with respect to the compressible layer and configured to be in contact with the textured surface of the base foam, the contact layer having a secant modulus at 5% strain of at least about 7 when measured according to modified ASTM D3574-11, Test E, Tensile Test. Preferred embodiments of this first embodiment of the invention may include one or a combination an any two or more of the following features:

- the contact layer has a secant modulus at 5% strain of at least 10 in at least one of Directions 1-4 in modified ASTM D3574-11, Test E, Tensile Test;
- the contact layer has a secant modulus at 5% strain of at least 10 in at least two of Directions 1-4 in modified ASTM D3574-11, Test E, Tensile Test;
- the contact layer has a secant modulus at 5% strain of at least 10 in at least three of Directions 1-4 in modified ASTM D3574-11, Test E, Tensile Test;
- the contact layer has a secant modulus at 5% strain of at least 10 in each of Directions 1-4 in modified ASTM D3574-11, Test E, Tensile Test;
- the contact layer has a secant modulus at 5% strain of at least 15 in at least two of Directions 1-4 in modified ASTM D3574-11, Test E, Tensile Test;
- the contact layer has a secant modulus at 5% strain of at least 15 in at least three of Directions 1-4 in modified ASTM D3574-11, Test E, Tensile Test;
- the contact layer has a secant modulus at 5% strain of at least 15 in each of Directions 1-4 in modified ASTM D3574-11, Test E, Tensile Test;
- the contact layer is woven;
- the contact layer is nonwoven;
- the contact layer is in the form of a spunbound fabric or a scrim;
- the contact layer is in the form of a film (e.g., blown film, extruded film, cast film, etc.);
- the contact layer comprises a polymer layer (e.g. thermoplastic olefin, polyurethane rubber, etc.);
- the polymer layer comprises a polyester;
- the polymer layer comprises a polypropylene;
- the polymer layer comprises a mixture of polyester and polypropylene;
- the polymer layer comprises a nylon;
- the compressible buffer layer has a thickness of at least about 3 mm;
- the compressible buffer layer has a thickness in the range of from about 3 mm to about 20 mm;
- The foam article defined in claims 1-17, wherein the compressible buffer layer has a thickness in the range of from about 3 mm to about 18 mm;
- the compressible buffer layer has a thickness in the range of from about 3 mm to about 15 mm;
- the compressible buffer layer has a thickness in the range of from about 6 mm to about 18 mm;
- the compressible buffer layer has a thickness in the range of from about 6 mm to about 15 mm;
- the contact layer comprises a laminate configuration comprising two or more sub-layers secured with respect to one another;
- the contact layer is secured to an inner surface of the trim cover and is movable with respect to the textured surface of the foam element;
- the contact layer is secured to the textured surface of the foam element and is movable with respect to an inner surface of the trim cover;
- the base foam comprises an isocyanate-based foam;
- the base foam comprises a polyurethane foam;
- the polyurethane foam has a density in the range of from about 30 kg/m$^3$ to about 80 kg/m$^3$;

the polyurethane foam has a density in the range of from about 35 kg/m³ to about 70 kg/m³;

the polyurethane foam has a density in the range of from about 40 kg/m³ to about 60 kg/m³;

the polyurethane foam has a density in the range of from about 45 kg/m³ to about 55 kg/m³;

the polyurethane foam has a density in the range of about 50 kg/m³;

the compressible buffer layer comprises a foam layer;

the compressible buffer layer comprises an isocyanate-based foam layer;

the compressible buffer layer comprises a polyurethane foam layer;

the polyurethane foam layer has a density greater than or equal to about 1 pcf;

the polyurethane foam layer has a density in the range of from about 1 pcf to about 4 pcf;

the polyurethane foam layer has a density in the range of from about 1.2 pcf to about 3.5 pcf;

the polyurethane foam layer has a density in the range of from about 1.5 pcf to about 3.0 pcf;

the polyurethane foam layer has a density in the range of from about 1.7 pcf to about 1.9 pcf;

the compressible buffer layer is adhered to the inner portion of the finished outer layer;

the compressible buffer layer is laminated to the inner portion of the finished outer layer;

the compressible buffer layer is flame laminated to the inner portion of the finished outer layer;

the ratio of the Indentation Force Deflection measured pursuant to ASTM D3574, Test B1 (IFD) of the base foam to the IFD of compressible buffer layer is in the range of from about 7 N/lb to about 17 N/lb;

the ratio of the IFD of the base foam to the IFD of compressible buffer layer is in the range of from about 8 N/lb to about 15 N/lb;

the IFD of the base foam to the IFD of compressible buffer layer is in the range of from about 10 N/lb to about 13 N/lb;

the ratio of the density of the compressible buffer layer to the IFD of the base foam is less than or equal to 3000 pcf/N or greater than or equal to 5000 pcf/N;

the ratio of the density of the compressible buffer layer to the IFD of the base foam is less than or equal to 2000 pcf/N or greater than or equal to 6000 pcf/N;

the ratio of the density of the compressible buffer layer to the IFD of the base foam is less than or equal to 2500 pcf/N or greater than or equal to 5500 pcf/N;

the ratio of the density of the compressible buffer layer to the IFD of the base foam is less than or equal to 3000 pcf/N or greater than or equal to 5000 pcf/N;

the ratio of the density of the compressible buffer layer to the IFD of the base foam is less than or equal to 3500 pcf/N or greater than or equal to 4500 pcf/N;

the ratio of the density of the base foam to the IFD of the compressible buffer layer is greater than or equal to 0.90 (kg/m³)/lb;

the ratio of the density of the base foam to the IFD of the compressible buffer layer is greater than or equal to 1.20 (kg/m³)/lb;

the ratio of the density of the base foam to the IFD of the compressible buffer layer is greater than or equal to 1.25 (kg/m³)/lb;

the ratio of the density of the base foam to the IFD of the compressible buffer layer is greater than or equal to 1.40 (kg/m³)/lb.

In a first embodiment, the present invention relates to a foam article comprising: a base foam having a textured surface; a trim cover comprising a finished outer layer; and optionally, a contact layer interposed between the foam element and the trim cover, the contact layer in contact with at least a portion of the textured surface of the base foam and comprising a contact material; the foam article having a read through score of at least 20 when measured pursuant to modified ASTM D3575-11 $I_2$ (Procedure B). Preferred embodiments of this first embodiment of the invention may include one or a combination an any two or more of the following features:

the contact layer comprises a polymer layer (e.g., thermoplastic olefin, polyurethane rubber, etc.);

the polymer layer comprises a polyester;

the polymer layer comprises a polypropylene;

the polymer layer comprises a mixture of polyester and polypropylene;

the polymer layer comprises a nylon;

the polymer layer is woven;

the polymer layer is nonwoven;

the polymer layer is in the form of a spunbound fabric or scrim;

the contact layer is in the form of a film (e.g., blow film, extruded film, cast film, etc.);

the contact layer is in the form of a wax;

the contact layer is secured to an inner surface of the trim cover and is movable with respect to the textured surface of the foam element;

the contact layer is secured to the textured surface of the foam element and is movable with respect to an inner surface of the trim cover;

the base foam comprises an isocyanate-based foam;

the foam element comprises a polyurethane foam;

the foam article further comprises an intermediate foam layer disposed between the finished outer layer and the contact layer;

the intermediate foam layer comprises an isocyanate-based foam the intermediate foam layer comprises a polyurethane foam; and/or the intermediate foam layer is laminated to an inner surface of the trim cover.

Preferred embodiments of this first embodiment and the second embodiment of the invention may include one or a combination an any two or more of the following features:

the foam article further comprises a frame element secured with respect to the foam element;

the foam article is in the form of a vehicular seat;

the vehicular seat comprises a vehicular seat back;

the vehicular seat comprises a vehicular seat bottom;

the vehicular seat is ventilated;

the textured surface comprises a plurality of peak portions and a plurality of valley portions;

each peak portion comprises an apex portion;

the apex portion comprises a first pointed portion;

the apex portion comprises a first rounded portion;

the apex portion comprises a first flat portion;

each valley portion comprises a nadir portion;

the nadir portion comprises a second pointed portion;

the nadir portion comprises a second rounded portion;

the nadir portion comprises a second flat portion;

each peak portion comprises an apex portion and each valley portion comprises a nadir portion;

the apex portion and the nadir portion comprise the same profile;

the apex portion and the nadir portion comprise a different profile;
the apex portion comprises a first pointed portion;
the apex portion comprises a first rounded portion;
the apex portion comprises a first flat portion;
the nadir portion comprises a second pointed portion;
the nadir portion comprises a second rounded portion;
the nadir portion comprises a second flat portion;
each peak portion in the plurality of peak portions is substantially elongate;
the plurality of peak portions are disposed substantially parallel to one another;
each valley portion in the plurality of valley portions is substantially elongate;
the plurality of peak portions comprises a first series of elongate peak portions and a second series of elongate peak portions, the first series and the second series being disposed transverse to one another;
the plurality of peak portions comprises a first series of elongate peak portions and a second series of elongate peak portions, the first series and the second series being disposed non-parallel to one another;
the plurality of peak portions comprises a first series of elongate peak portions and a second series of elongate peak portions, the first series and the second series being disposed orthogonal to one another;
the plurality of valley portions comprises a first series of elongate valley portions and a second series of elongate valley portions, the first series and the second series being disposed transverse to one another;
the plurality of valley portions comprises a first series of elongate valley portions and a second series of elongate valley portions, the first series and the second series being disposed non-parallel to one another;
the plurality of valley portions comprises a first series of elongate valley portions and a second series of elongate valley portions, the first series and the second series being disposed orthogonal to one another;
each peak portion in the plurality of peak portions is substantially elongate and each valley portion in the plurality of valley portions is substantially elongate;
the plurality of peak portions and the plurality of valley portions are disposed in a substantially parallel relationship;
the plurality of peak portions is comprised in a plurality of substantially upstanding projections;
a cross-section of each projection comprises a rectangle;
a cross-section of each projection comprises a trapezoid;
a cross-section of each projection comprises a bi-laterally symmetrical trapezoid;
a cross-section of each projection comprises an ogival shape;
a cross-section of adjacent projections comprises a scallop shape;
a cross-section of valley portions between adjacent projections comprises a scallop shape;
each projection comprises a cloister vault shape;
the plurality of projections comprise substantially the same shape;
the plurality of projections comprise substantially the same dimension;
the plurality of projections comprise substantially the same shape and the same dimension;
the plurality of projections comprise different shapes;
the plurality of projections comprise different dimensions;
the plurality of projections comprise different shapes and different dimensions;
the plurality of projections comprise substantially the same shape and different dimensions;
the plurality of projections comprise different shapes and the same dimension;
at least two valley portions are interconnected to one another;
the plurality of valley portions are interconnected to one another;
at least two valley portions are independent of one another;
the plurality of valley portions are independent of one another;
at least two peak portions are interconnected to one another;
the plurality of peak portions are interconnected to one another;
at least two peak portions are independent of one another;
the plurality of peak portions are independent of one another;
the textured surface comprises a first crenellated pattern;
the textured surface comprises a first crenellated pattern and a second crenellated pattern disposed in a transverse relationship with respect to one another;
the textured surface comprises a first crenellated pattern and a second crenellated pattern disposed in an orthogonal relationship with respect to one another;
the textured comprises a first dentellated pattern;
the textured surface comprises a first dentellated pattern and a second dentellated pattern disposed in a transverse relationship with respect to one another;
the textured surface comprises a first dentellated pattern and a second dentellated pattern disposed in an orthogonal relationship with respect to one another;
the textured surface comprises a plurality of textured portions, each textured portion comprising a plurality of peak portions and a plurality of valley portions;
the plurality of peak portions in each section are the same;
the plurality of valley portions in each section are the same;
the plurality of peak portions and the plurality of valley portions in each section are the same;
the plurality of peak portions in each section are different;
the plurality of valley portions in each section are different;
the plurality of peak portions and the plurality of valley portions in each section are different;
the foam article further comprises at least one groove that separates at least a portion of a pair of adjacent textured portions of the plurality of textured portions;
the base foam comprises a uniform density; and/or
the base foam comprises a variable density.

Embodiments of the present invention will now be described with reference to the following Examples which should not be construed as limiting the scope of the invention.

In the Examples, the following terms have the indicated meanings:

"pbw" refers to parts by weight;

"IFD" refers to Indentation Force Deflection measured pursuant to ASTM D3574, Test $B_1$; and "pcf" refers pounds per cubic foot.

Figure 2:
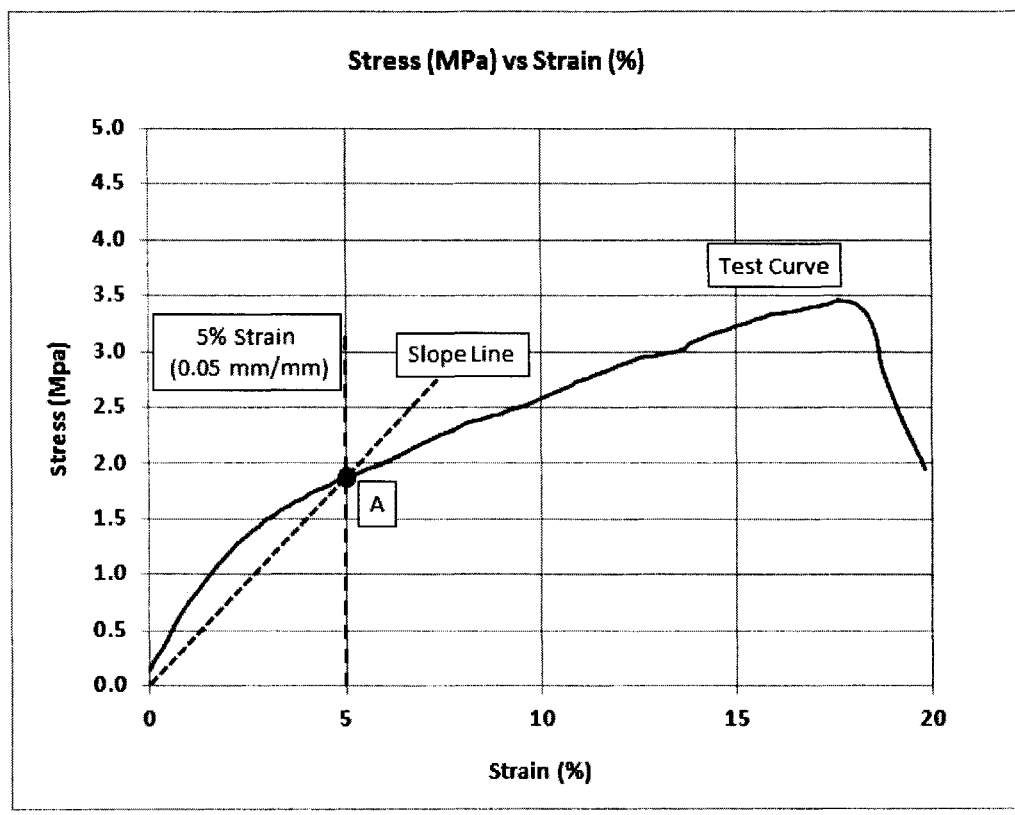

In the Examples, the following materials were used:

Trim cover outer material: a cloth trim cover material commercially available under the tradename Splinter™ was used in the test trim cover (described in more detail below);

Laminate Foam #1 (LF-1): a slab polyurethane foam having a density of 1.7 pcf and at IFD of 40 pounds at 25% compression;

Laminate Foam #2 (LF-2): a slab polyurethane foam having a density of 1.7 pcf and at IFD of 25 pounds at 25% compression;

Laminate Foam #3 (LF-3): a slab polyurethane foam having a density of 1.9 pcf and at IFD of 55 pounds at 25% compression;

Laminate Foam #4 (LF-4): a slab polyurethane foam having a density of 2.7 pcf and at IFD of 120 pounds at 25% compression;

Contact Layer #1 (CL-1): a woven scrim layer commercially available from Acme Mills (Grade TB16);

Contact Layer #2 (CL-2): a woven scrim layer commercially available from Mallon (Grade 1700);

Contact Layer #3 (CL-3): a woven scrim layer commercially available from American Textile (Grade 13/17);

Contact Layer #4 (CL-4): a non-woven scrim layer commercially available from Haynes (Grade 9803X);

Block Foam #1 (BF-1): a molded polyurethane foam having a diamond-shaped textured surface, a density of 35 kg/m$^3$ and an IFD of 300 N at a 50% compression;

Block Foam #2 (BF-2): a molded polyurethane foam having a diamond-shaped textured surface, a density of 35 kg/m$^3$ and an IFD of 600 N at a 50% compression;

Block Foam #3 (BF-3): a molded polyurethane foam having a diamond-shaped textured surface, a density of 50 kg/m$^3$ and an IFD of 300 N at a 50% compression;

Block Foam #4 (BF-4): a molded polyurethane foam having a diamond-shaped textured surface, a density of 50 kg/m$^3$ and an IFD of 600 N at a 50% compression;

Block Foam #5 (BF-5): a molded polyurethane foam having a diamond-shaped textured surface, a density of 42 kg/m$^3$ and an IFD of 471 N at a 50% compression;

Each contact layer was subject to a modified ASTM D3574-11, Test E, Tensile Test. The following protocol was used (the term "modified ASTM D3574-11, Test E, Tensile Test" as used throughout this specification is intended to be understood to mean the following protocol):

perform the test as described by ASTM D3574-11, Test E, except the test specimen shall be 80×25×the material thickness;

tape shall be adhered to the ends of the test specimen, which directly corresponds to the contact surface of the grip faces retaining the specimen (the tape is added to the specimen for two reasons: (i) to prevent the grip from damaging the test specimen and causing a premature rupture or shearing of the specimen during the test; and (ii) to insure the specimen is held securely in place between the grip surfaces);

test the material in four directions as illustrated FIG. 1 (in FIG. 1, Directions 1 and 2 are the material principal directions whereas Directions 3 and 4 are designated as shear directions since they are 45 degrees to Directions 1 and 2);

the principle directions are determined by industry accepted norms and include criteria such as fiber direction or machine direction;

produce a tensile curve and determine the point on the tensile curve where it reaches 5% strain (Point A)—see FIG. 2 which illustrates the test results for a sample contact layer (CL-4);

extend a line from the origin of the test graph that bisects point A; and calculate the slope of this line to determine the secant modulus in megapascals (MPa) at 5% strain.

It is to be noted that CL-4 was a non-woven material. Thus, it did not have a fiber direction or a detectable machine direction. Notwithstanding this, it was subject to the same type of test by arbitrarily choosing two directions orthogonal to one another—these directions were noted as the principle directions. The two shear directions were chosen by rotating each principle direction by 45 degrees. The approach is applicable to any non-woven contact layer (or any contact layer having no discernible fiber direction and/or machine direction).

The results of tensile testing of each contact layer is reported in Table 1. As can be seen CL-1 and CL-4 had a secant modulus at 5% strain greater than 7 in all four directions. In contrast, CL-2 had a secant modulus at 5% strain less than 7 in all four directions and CL-3 had a secant modulus at 5% strain greater than 7 in only two of the four directions (the two principle directions). The effect of these results will be discussed further hereinbelow.

The test trim cover was produced by flame laminating: (i) the trim cover outer material to one side of the laminate foam, and (ii) the contact layer to the other side of the laminate foam. The test trim cover was then secured to the foam block such that the textured surface in the foam block was oriented as the so-called A-surface of the resulting covered foam block (see further details below).

Figure 3:
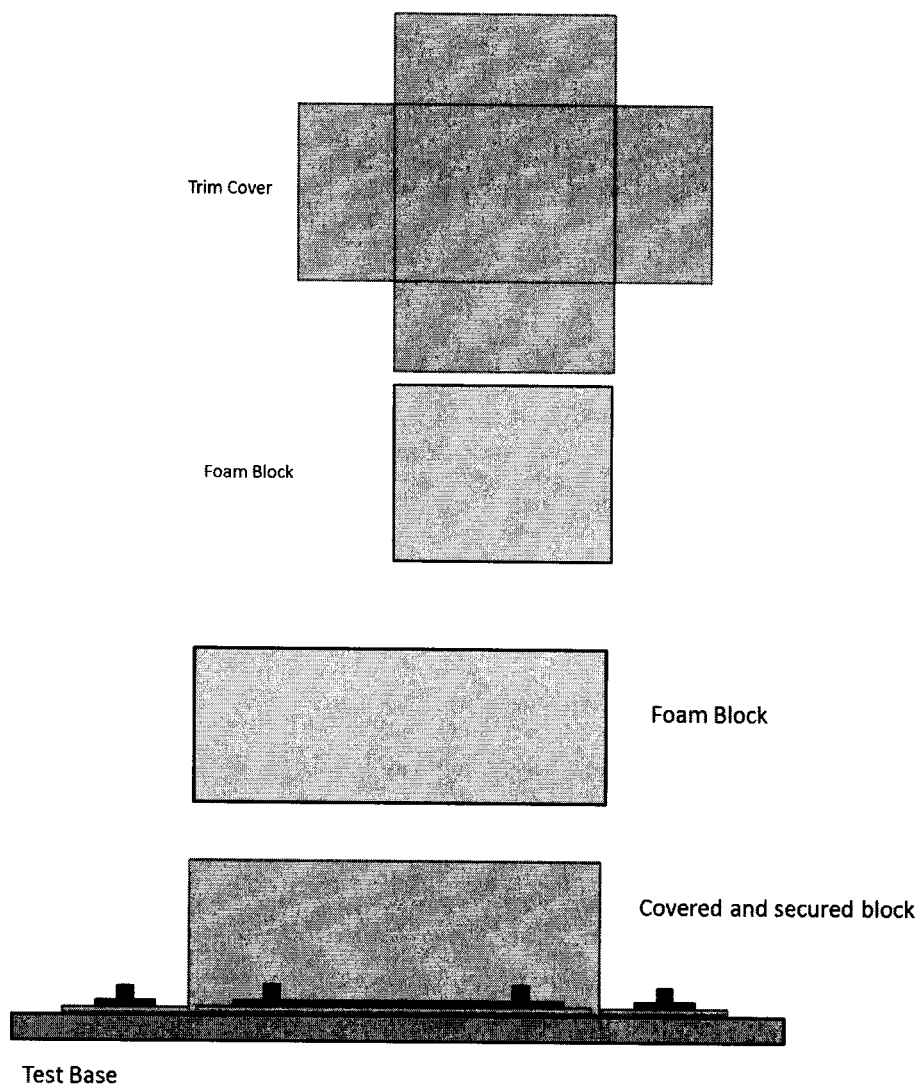

The covered foam block was subjected to a modified ASTM D3574-11, I$_2$; Dynamic Fatigue Test by Roller Shear at Constant Force (Procedure B). The following protocol was used (the term "modified ASTM D3574-11, I$_2$ (Procedure B))" as used throughout this specification is intended to be understood to mean the following protocol):

perform the roller shear test with the following procedural modifications and added test observations;

use a 267 N roller;

take pictures of the block foam sample surface, the foam laminate on the inside of test trim cover and the cover foam block prior to testing;

place a new test trim cover over the A-surface of foam block;

the test trim cover sample must be large enough to cover the A-surface of the foam block, extend down its sides and onto the base of the roller shear table;

secure the trim cover to the test base to hold it in place during testing—see FIG. 3;

perform the test as prescribed in ASTM D3574-11 (Procedure B);

pictures shall be taken and observations shall be made at 100, 500, 1000, 2000, 6000, and 10,000 cycles at which point testing will stop for that day;

recommence testing on next day and take pictures/make observations made at 18,000, and 20,000 cycles;

at each cycle stoppage, take pictures and make observations concerning read through on the cover surface, including the intensity level of read through as follows (this will produce 8 data points):

NV: no visible read through (score=4);

L: light read through (need to look at the trim at an angle or scrutinize to see) (score=3), or M: medium read through (visible) (score=2), or H: heavy read through (plainly visible at a quick look or from a distance) (score=1);

sum the data points from the previous step and report the sum as "read through score";

wait 60-65 minutes and take pictures of the cover foam block, the A-surface of the foam block and the foam laminate on the inside of the test trim cover; and note any deterioration of the trim cover lamination or foam surface.

The results on read through testing done on various covered foam blocks is reported in Table 2 which sets out an orthogonal design of experiments matrix.

While this invention has been described with reference to illustrative embodiments and examples, the description is not intended to be construed in a limiting sense. Thus, various modifications of the illustrative embodiments, as well as other embodiments of the invention, will be apparent to persons skilled in the art upon reference to this description. It is therefore contemplated that the appended claims will cover any such modifications or embodiments. Further, all of the claims are hereby incorporated by reference into the description of the preferred embodiments.

All publications, patents and patent applications referred to herein are incorporated by reference in their entirety to the same extent as if each individual publication, patent or patent application was specifically and individually indicated to be incorporated by reference in its entirety.

TABLE 1

| Contact Layer | Direction | Secant Modulus @ 5% Strain |
|---|---|---|
| CL-1 | 1 | 7.70 |
|  | 2 | 30.89 |
|  | 3 | 9.45 |
|  | 4 | 8.16 |
| CL-2 | 1 | 0.53 |
|  | 2 | 0.14 |
|  | 3 | 0.41 |
|  | 4 | 0.28 |
| CL-3 | 1 | 9.31 |
|  | 2 | 16.11 |
|  | 3 | 2.12 |
|  | 4 | 3.23 |
| CL-4 | 1 | 25.20 |
|  | 2 | 44.57 |
|  | 3 | 29.42 |
|  | 4 | 25.86 |

TABLE 2

| Sample No. | Block Foam | Laminate Foam | Contact Layer | Read Through Score |
|---|---|---|---|---|
| 1 | BF-2 | LF-3 @ 6 mm | — | 22 |
| 2 | BF-3 | LF-2 @ 6 mm | — | 22 |
| 3 | BF-4 | LF-1 @ 3 mm | — | 12 |
| 4 | BF-1 | LF-4 @ 3 mm | — | 12 |
| 5 | BF-2 | LF-2 @ 12 mm | — | 21 |
| 6 | BF-1 | LF-1 @ 6 mm | — | 14 |
| 7 | BF-4 | LF-4 @ 6 mm | — | 12 |
| 8 | BF-2 | LF-1 @ 6 mm | CL-3 | 21 |
| 9 | BF-3 | LF-1 @ 6 mm | CL-1 | 10 |
| 10 | BF-2 | LF-1 @ 3 mm | CL-4 | 10 |
| 11 | BF-1 | LF-1 @ 3 mm | CL-2 | 10 |
| 12 | BF-1 | LF-1 @ 12 mm | — | 10 |
| 13 | BF-3 | LF-1 @ 3 mm | CL-3 | 10 |
| 14 | BF-5 | LF-1 @ 12 mm | CL-4 | 30 |
| 15 | BF-5 | LF-1 @ 6 mm | CL-4 | 29 |
| 16 | BF-2 | LF-1 @ 12 mm | CL-1 | 28 |
| 17 | BF-2 | LF-1 @ 12 mm | CL-4 | 28 |
| 18 | BF-2 | LF-4 @ 12 mm | — | 28 |
| 19 | BF-2 | LF-4 @ 6 mm | — | 26 |
| 20 | BF-2 | LF-1 @ 12 mm | CL-2 | 25 |
| 21 | BF-5 | LF-1 @ 3 mm | CL-4 | 23 |
| 22 | BF-2 | LF-3 @ 12 mm | — | 21 |
| 23 | BF-2 | LF-4 @ 3 mm | — | 21 |
| 24 | BF-2 | LF-1 @ 12 mm | CL-3 | 20 |
| 25 | BF-2 | LF-1 @ 6 mm | — | 19 |
| 26 | BF-2 | LF-1 @ 12 mm | — | 19 |
| 27 | BF-2 | LF-1 @ 6 mm | CL-1 | 17 |
| 28 | BF-2 | LF-1 @ 6 mm | CL-2 | 15 |
| 29 | BF-2 | LF-1 @ 6 mm | CL-4 | 15 |
| 30 | BF-2 | LF-1 @ 3 mm | CL-4 | 14 |
| 31 | BF-2 | LF-1 @ 3 mm | CL-1 | 13 |
| 32 | BF-2 | LF-2 @ 6 mm | — | 12 |
| 33 | BF-2 | LF-1 @ 3 mm | CL-2 | 11 |
| 34 | BF-2 | LF-1 @ 3 mm | CL-3 | 11 |
| 35 | BF-2 | LF-2 @ 3 mm | — | 11 |
| 36 | BF-2 | none | — | 8 |
| 37 | BF-2 | LF-1 @ 3 mm | — | 8 |
| 38 | BF-2 | LF-3 @ 3 mm | — | 8 |
| 39 | BF-3 | LF-3 @ 12 mm | — | 21 |
| 40 | BF-4 | LF-1 @ 12 mm | CL-2 | 8 |
| 41 | BF-1 | LF-1 @ 12 mm | — | 21 |

What is claimed is:

1. A foam article comprising:
a base foam having a textured surface; and
a trim cover covering at least a portion of the textured surface, the trim cover comprising: (i) a finished outer layer comprising an occupant-contact outer portion and an inner portion; (ii) a compressible buffer layer secured with respect to the inner portion of the finished outer layer; and (iii) a contact layer secured with respect to the compressible buffer layer and configured to be in contact with the textured surface of the base foam, the contact layer having a secant modulus at 5% strain of at least 7 when measured according to modified ASTM D3574-11, Test E, Tensile Test.

2. The foam article defined in claim 1, wherein the contact layer has a secant modulus at 5% strain of at least 10 in each of Directions 1-4 in modified ASTM D3574-11, Test E, Tensile Test.

3. The foam article defined in claim 1, wherein the contact layer has a secant modulus at 5% strain of at least 15 in each of Directions 1-4 in modified ASTM D3574-11, Test E, Tensile Test.

4. The foam article defined in claim 1, wherein the contact layer is nonwoven.

5. The foam article defined in claim 1, wherein the compressible buffer layer has a thickness in the range of from 3 mm to 15 mm.

6. The foam article defined in claim 1, wherein the contact layer comprises a laminate configuration comprising two or more sub-layers secured with respect to one another.

7. The foam article defined in claim 1, wherein the compressible buffer layer comprises a polyurethane foam layer.

8. The foam article defined in claim 1, wherein the compressible buffer layer is flame laminated to the inner portion of the finished outer layer.

9. The foam article defined in claim 1, wherein the ratio of the Indentation Force Deflection measured pursuant to ASTM D3574, Test B1 (IFD) of the base foam to the IFD of compressible buffer layer is in the range of from 7 N/lb to 17 N/lb.

10. The foam article defined in claim 1, wherein the ratio of the density of the compressible buffer layer to the IFD of the base foam is less than or equal to 3000 pcf/N or greater than or equal to 5000 pcf/N.

11. The foam article defined in claim 1, wherein the ratio of the density of the base foam to the IFD of the compressible buffer layer is greater than or equal to 0.90 $(kg/m^3)/lb$.

12. The foam article defined in claim 1, wherein the contact layer has a secant modulus at 5% strain of at least 10 in at least one of Directions 1-4 in modified ASTM D3574-11, Test E, Tensile Test.

13. The foam article defined in claim 1, wherein the contact layer has a secant modulus at 5% strain of at least 10 in at least two of Directions 1-4 in modified ASTM D3574-11, Test E, Tensile Test.

14. The foam article defined in claim 1, wherein the contact layer has a secant modulus at 5% strain of at least 10 in at least three of Directions 1-4 in modified ASTM D3574-11, Test E, Tensile Test.

15. The foam article defined in claim 1, wherein the contact layer has a secant modulus at 5% strain of at least 15 in at least two of Directions 1-4 in modified ASTM D3574-11, Test E, Tensile Test.

16. The foam article defined in claim 1, wherein the contact layer has a secant modulus at 5% strain of at least 15 in at least three of Directions 1-4 in modified ASTM D3574-11, Test E, Tensile Test.

17. The foam article defined in claim 1, wherein the contact layer is a film.

18. The foam article defined in claim 1, wherein the contact layer comprises a polymer layer.

19. The foam article defined in claim 18, wherein the polymer layer comprises a polyester.

20. The foam article defined in claim 18, wherein the polymer layer comprises a polypropylene.

21. The foam article defined in claim 18, wherein the polymer layer comprises a mixture of polyester and polypropylene.

22. The foam article defined in claim 20, wherein the polymer layer comprises a nylon.

23. The foam article defined in claim 1, wherein the compressible buffer layer has a thickness of at least 3 mm.

24. The foam article defined in claim 1, wherein the compressible buffer layer has a thickness in the range of from 3 mm to 20 mm.

25. The foam article defined in claim 1, wherein the compressible buffer layer has a thickness in the range of from 3 mm to 18 mm.

26. The foam article defined in claim 1, wherein the compressible buffer layer has a thickness in the range of from 6 mm to 18 mm.

27. The foam article defined in claim 1, wherein the compressible buffer layer has a thickness in the range of from 6 mm to 15 mm.

28. The foam article defined in claim 1, wherein the contact layer is secured to an inner surface of the trim cover and is movable with respect to the textured surface of the foam article.

29. The foam article defined in claim 1, wherein the base foam comprises an isocyanate-based foam.

30. The foam article defined in claim 1, wherein the base foam comprises a polyurethane foam.

31. The foam article defined in claim 30, wherein the polyurethane foam has a density in the range of from 30 kg/m$^3$ to 80 kg/m$^3$.

32. The foam article defined in claim 30, wherein the polyurethane foam has a density in the range of from 35 kg/m$^3$ to 70 kg/m$^3$.

33. The foam article defined in claim 30, wherein the polyurethane foam has a density in the range of from 40 kg/m$^3$ to 60 kg/m$^3$.

34. The foam article defined in claim 30, wherein the polyurethane foam has a density in the range of from 45 kg/m$^3$ to 55 kg/m$^3$.

35. The foam article defined in claim 30, wherein the polyurethane foam has a density in the range of 50 kg/m$^3$.

36. The foam article defined in claim 1, wherein the compressible buffer layer comprises a foam layer.

37. The foam article defined in claim 1, wherein the compressible buffer layer comprises an isocyanate-based foam layer.

38. The foam article defined in claim 7, wherein the polyurethane foam layer has a density greater than or equal to 1 pcf.

39. The foam article defined in claim 7, wherein the polyurethane foam layer has a density in the range of from 1 pcf to 4 pcf.

40. The foam article defined in claim 7, wherein the polyurethane foam layer has a density in the range of from 1.2 pcf to 3.5 pcf.

41. The foam article defined in claim 7, wherein the polyurethane foam layer has a density in the range of from 1.5 pcf to 3.0 pcf.

42. The foam article defined in claim 7, wherein the polyurethane foam layer has a density in the range of from 1.7 pcf to 1.9 pcf.

43. The foam article defined in claim 1, wherein the compressible buffer layer is laminated to the inner portion of the finished outer layer.

44. The foam article defined in claim 1, wherein the ratio of the IFD of the base foam to the IFD of compressible buffer layer is in the range of from 8 N/lb to 15 N/lb.

45. The foam article defined in claim 1, wherein the ratio of the IFD of the base foam to the IFD of compressible buffer layer is in the range of from 10 N/lb to 13 N/lb.

46. The foam article defined in claim 1, wherein the ratio of the density of the compressible buffer layer to the IFD of the base foam is less than or equal to 2000 pcf/N or greater than or equal to 6000 pcf/N.

47. The foam article defined in claim 1, wherein the ratio of the density of the compressible buffer layer to the IFD of the base foam is less than or equal to 2500 pcf/N or greater than or equal to 5500 pcf/N.

48. The foam article defined in claim 1, wherein the ratio of the density of the compressible buffer layer to the IFD of the base foam is less than or equal to 3000 pcf/N or greater than or equal to 5000 pcf/N.

49. The foam article defined in claim 1, wherein the ratio of the density of the compressible buffer layer to the IFD of the base foam is less than or equal to 3500 pcf/N or greater than or equal to 4500 pcf/N.

50. The foam article defined in claim 1, wherein the ratio of the density of the base foam to the IFD of the compressible buffer layer is greater than or equal to 1.20 (kg/m$^3$)/lb.

51. The foam article defined in claim 1, wherein the ratio of the density of the base foam to the IFD of the compressible buffer layer is greater than or equal to 1.25 (kg/m$^3$)/lb.

52. The foam article defined in claim 1, wherein the ratio of the density of the base foam to the IFD of the compressible buffer layer is greater than or equal to 1.40 (kg/m$^3$)/lb.

53. The foam article defined in claim 1, wherein the contact layer is a spunbound fabric or a scrim.

54. The foam article defined in claim 1, wherein the contact layer is secured to the textured surface of the foam article and is movable with respect to an inner surface of the trim cover.

55. The foam article defined in claim 1, wherein the compressible buffer layer is adhered to the inner portion of the finished outer layer.

56. The foam article defined in claim 1, further comprising a frame element secured with respect to the foam article.

57. The foam article defined in claim 1, wherein the foam article is a component of a vehicular seat.

58. The foam article defined in claim 57, wherein the vehicular seat is ventilated.

59. The foam article defined in claim 1, wherein the foam article is a vehicular seat back.

60. The foam article defined in claim 1, wherein the foam article is a vehicular seat bottom.

61. The foam article defined in claim 1, wherein the textured surface comprises a plurality of peak portions and a plurality of valley portions.

62. The foam article defined in claim 61, wherein each peak portion comprises an apex portion.

63. The foam article defined in claim 62, wherein the apex portion comprises a first pointed portion.

64. The foam article defined in claim 62, wherein the apex portion comprises a first rounded portion.

65. The foam article defined in claim 62, wherein the apex portion comprises a first flat portion.

66. The foam article defined in claim 61, wherein each valley portion comprises a nadir portion.

67. The foam article defined in claim 66, wherein the nadir portion comprises a second pointed portion.

68. The foam article defined in claim 66, wherein the nadir portion comprises a second rounded portion.

69. The foam article defined in claim 66, wherein the nadir portion comprises a second flat portion.

70. The foam article defined in claim 66, wherein each peak portion comprises an apex portion and each valley portion comprises a nadir portion.

71. The foam article defined in claim 70, wherein the apex portion and the nadir portion comprise a common profile.

72. The foam article defined in claim 70, wherein the apex portion and the nadir portion comprise a different profile.

73. The foam article defined in any one of claim 70, wherein the apex portion comprises a first pointed portion.

74. The foam article defined in any one of claim 70, wherein the apex portion comprises a first rounded portion.

75. The foam article defined in any one of claim 70, wherein the apex portion comprises a first flat portion.

76. The foam article defined in any one of claim 70, wherein the nadir portion comprises a second pointed portion.

77. The foam article defined in any one of claim 70, wherein the nadir portion comprises a second rounded portion.

78. The foam article defined in any one of claim 70, wherein the nadir portion comprises a second flat portion.

79. The foam article defined in any one of claim 70, wherein each peak portion in the plurality of peak portions is elongate.

80. The foam article defined in claim 79, wherein the plurality of peak portions are disposed parallel to one another.

81. The foam article defined in any one of claim 61, wherein each valley portion in the plurality of valley portions is elongate.

82. The foam article defined in any one of claim 61, wherein the plurality of peak portions comprises a first series of elongate peak portions and a second series of elongate peak portions, the first series and the second series being disposed transverse to one another.

83. The foam article defined in any one of claim 61, wherein the plurality of peak portions comprises a first series of elongate peak portions and a second series of elongate peak portions, the first series and the second series being disposed non-parallel to one another.

84. The foam article defined in any one of claim 61, wherein the plurality of peak portions comprises a first series of elongate peak portions and a second series of elongate peak portions, the first series and the second series being disposed orthogonal to one another.

85. The foam article defined in any one of claim 61, wherein the plurality of valley portions comprises a first series of elongate valley portions and a second series of elongate valley portions, the first series and the second series being disposed transverse to one another.

86. The foam article defined in any one of claim 61, wherein the plurality of valley portions comprises a first series of elongate valley portions and a second series of elongate valley portions, the first series and the second series being disposed non-parallel to one another.

87. The foam article defined in any one of claim 61, wherein the plurality of valley portions comprises a first series of elongate valley portions and a second series of elongate valley portions, the first series and the second series being disposed orthogonal to one another.

88. The foam article defined in any one of claim 61, wherein each peak portion in the plurality of peak portions is elongate and each valley portion in the plurality of valley portions is elongate.

89. The foam article defined in claim 88, wherein the plurality of peak portions and the plurality of valley portions are disposed in a parallel relationship.

90. The foam article defined in any one of claim 61, wherein the plurality of peak portions is comprised in a plurality of upstanding projections.

91. The foam article defined in claim 90, wherein a cross-section of each projection comprises a rectangle.

92. The foam article defined in claim 90, wherein a cross-section of each projection comprises a trapazoid.

93. The foam article defined in claim 90, wherein a cross-section of each projection comprises a bi-laterally symmetrical trapazoid.

94. The foam article defined in claim 90, wherein a cross-section of each projection comprises an ogival shape.

95. The foam article defined in claim 90, wherein a cross-section of adjacent projections comprises a scallop shape.

96. The foam article defined in claim 90, wherein a cross-section of valley portions between adjacent projections comprises a scallop shape.

97. The foam article defined in claim 90, wherein each projection comprises a cloister vault shape.

98. The foam article defined in claim 90, wherein the plurality of projections comprise the same shape.

99. The foam article defined in claim 90, wherein the plurality of projections comprise the same dimension.

100. The foam article defined in claim 90, wherein the plurality of projections comprise the same shape and the same dimension.

101. The foam article defined in claim 90, wherein the plurality of projections comprise different shapes.

102. The foam article defined in claim 90, wherein the plurality of projections comprise different dimensions.

103. The foam article defined in claim 90, wherein the plurality of projections comprise different shapes and different dimensions.

104. The foam article defined in claim 90, wherein the plurality of projections comprise the same shape and different dimensions.

105. The foam article defined in claim 90, wherein the plurality of projections comprise different shapes and the same dimension.

106. The foam article defined in claim 90, wherein at least two valley portions are interconnected to one another.

107. The foam article defined in claim 61, wherein the plurality of valley portions are interconnected to one another.

108. The foam article defined in claim 61, wherein at least two valley portions are independent of one another.

109. The foam article defined in claim 61, wherein the plurality of valley portions are independent of one another.

110. The foam article defined in claim 61, wherein at least two peak portions are interconnected to one another.

111. The foam article defined in claim 61, wherein the plurality of peak portions are interconnected to one another.

112. The foam article defined in claim 61, wherein at least two peak portions are independent of one another.

113. The foam article defined in claim 61, wherein the plurality of peak portions are independent of one another.

114. The foam article defined in claim 61, wherein the textured surface comprises a first crenellated pattern.

115. The foam article defined in claim 61, wherein the textured surface comprises a first crenellated pattern and a second crenellated pattern disposed in a transverse relationship with respect to one another.

116. The foam article defined in claim 61, wherein the textured surface comprises a first crenellated pattern and a second crenellated pattern disposed in an orthogonal relationship with respect to one another.

117. The foam article defined in claim 61, wherein the textured comprises a first dentellated pattern.

118. The foam article defined in claim 61, wherein the textured surface comprises a first dentellated pattern and a second dentellated pattern disposed in a transverse relationship with respect to one another.

119. The foam article defined in claim 61, wherein the textured surface comprises a first dentellated pattern and a second dentellated pattern disposed in an orthogonal relationship with respect to one another.

120. The foam article defined in claim 61, wherein the textured surface comprises a plurality of textured portions, each textured portion comprising a plurality of peak portions and a plurality of valley portions.

121. The foam article defined in claim 120, wherein the plurality of peak portions in each section are the same.

122. The foam article defined in claim 120, wherein the plurality of valley portions in each section are the same.

123. The foam article defined in claim 120, wherein the plurality of peak portions and the plurality of valley portions in each section are the same.

124. The foam article defined in claim 120, wherein the plurality of peak portions in each section are different.

125. The foam article defined in claim 120, wherein the plurality of valley portions in each section are different.

126. The foam article defined in claim 120, wherein the plurality of peak portions and the plurality of valley portions in each section are different.

127. The foam article defined in claim 120, further comprising at least one groove that separates at least a portion of a pair of adjacent textured portions of the plurality of textured portions.

128. The foam article defined in claim 1, wherein the base foam comprises a uniform density.

129. The foam article defined in claim 1, wherein the base foam comprises a variable density.

130. The foam article defined in claim 17, wherein the film comprises thermoplastic olefin.

131. The foam article defined in claim 17, wherein the film comprises polyurethane rubber.

132. The foam article defined in claim 18, wherein the polymer layer comprises thermoplastic olefin.

133. The foam article defined in claim 18, wherein the polymer layer comprises polyurethane rubber.

* * * * *